US008090961B2

(12) United States Patent
Yoffe et al.

(10) Patent No.: US 8,090,961 B2
(45) Date of Patent: Jan. 3, 2012

(54) SECURITY SWITCH

(75) Inventors: Simon Yoffe, Givat Shmuel (IL); David Yoffe, Givat Shmuel (IL)

(73) Assignee: Simon Yoffe, Givat Shmuel (IL)

( * ) Notice: Subject to any disclaimer, the term of this patent is extended or adjusted under 35 U.S.C. 154(b) by 579 days.

(21) Appl. No.: 11/741,751

(22) Filed: Apr. 29, 2007

(65) Prior Publication Data
US 2008/0178282 A1 Jul. 24, 2008

Related U.S. Application Data

(60) Provisional application No. 60/881,510, filed on Jan. 22, 2007.

(51) Int. Cl.
*G06F 9/00* (2006.01)
*G06F 11/30* (2006.01)
*G06F 7/04* (2006.01)
*H04L 29/06* (2006.01)
*H04K 1/00* (2006.01)
*H03K 19/00* (2006.01)

(52) U.S. Cl. ............... 713/193; 713/1; 713/2; 713/153; 380/2; 726/26; 326/8

(58) Field of Classification Search .............. 726/26; 379/102; 713/1, 2, 153, 193; 380/2; 326/8
See application file for complete search history.

(56) References Cited

U.S. PATENT DOCUMENTS

| 4,945,443 | A | * | 7/1990 | DeBiasi et al. ............. 361/93.1 |
| 5,402,465 | A | | 3/1995 | Foltz |
| 6,233,464 | B1 | * | 5/2001 | Chmaytelli ............... 455/556.2 |
| 7,024,700 | B1 | * | 4/2006 | Horikoshi et al. ............. 726/34 |
| 7,031,758 | B2 | | 4/2006 | Chang |
| 7,111,176 | B1 | * | 9/2006 | Ellison et al. ............... 726/34 |
| 2003/0062252 | A1 | | 4/2003 | Fonseca |
| 2004/0203536 | A1 | | 10/2004 | Chao et al. |
| 2004/0243825 | A1 | | 12/2004 | Hunt |
| 2005/0009496 | A1 | | 1/2005 | Chen |
| 2005/0271190 | A1 | * | 12/2005 | Linkenhoger ............. 379/93.05 |

FOREIGN PATENT DOCUMENTS

| JP | 11110505 A | * | 4/1999 |
| WO | WO 0063778 A1 | * | 10/2000 |

* cited by examiner

*Primary Examiner* — Mohammad Reza
(74) *Attorney, Agent, or Firm* — Mark M. Friedman

(57) ABSTRACT

A system and method for securing a personal device that includes a device core and a peripheral device from unauthorized access or operation. The system and method use a switch, included fully or partially within an envelope of the device and which cannot be affected in its operation by either the device core or the peripheral device. The switch may be activated by an authorized user of the personal device either preemptively or in response to a detected threat.

19 Claims, 12 Drawing Sheets

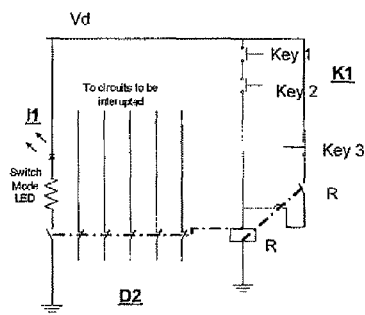
Fig 10
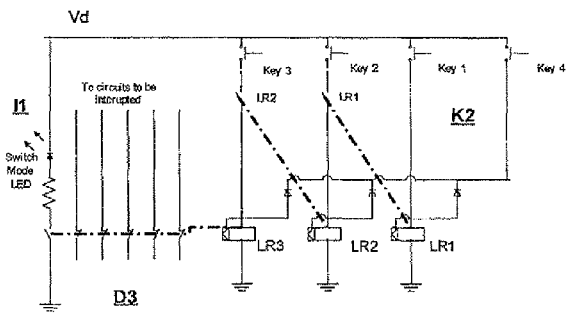
Fig 11
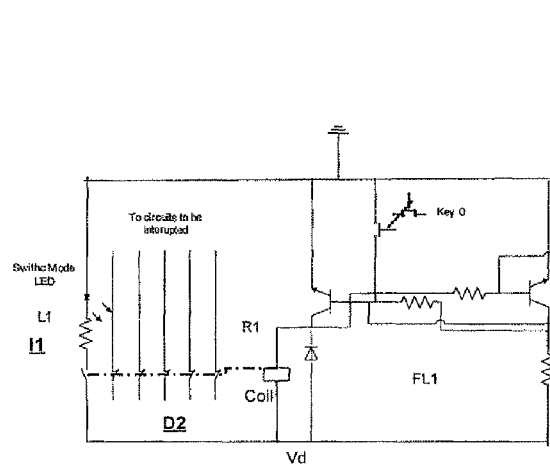
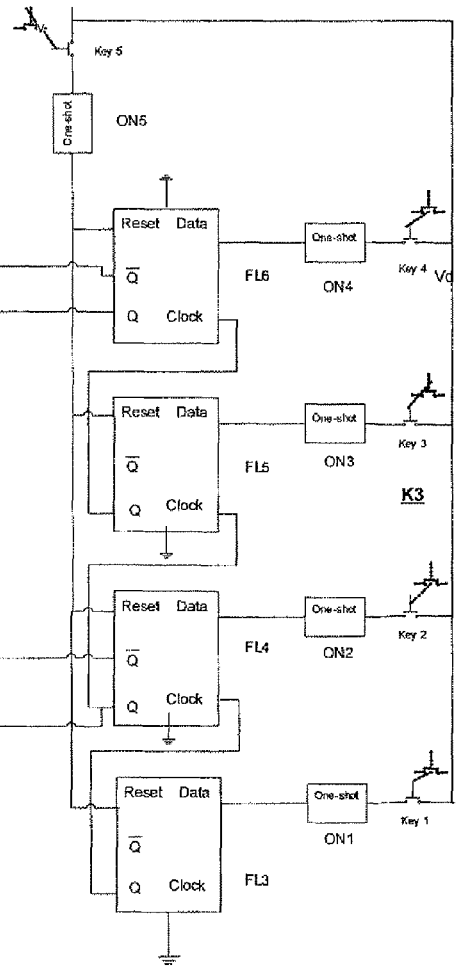
Fig 12

SECURITY SWITCH

CROSS REFERENCE TO RELATED APPLICATIONS

The present invention claims priority from U.S. Provisional Patent Application No. 60/881,510 filed 22 Jan. 2007, the contents of which are incorporated herein by reference.

TERMS

Authorized user—owner or permitted operator of a personal device.

Unauthorized user—any user or software that does not have an explicit permission to operate the personal device.

Unauthorized access—any attempt of an unauthorized user to access or operate a personal device False indication/notification—an indication showing one state, while the real state is different.

Hooked component—a component connected in parallel with other device(s) to the same input element, in such way that both devices can operate together, but the hooked component is isolated from the other device(s).

"Man in the middle"—a component logically placed between two other components and which can control the information passed between the two other components Secure Input—an input readable only to a permitted component, meaning that the input of the permitted component cannot be revealed by others components.

Internal—enclosed within an envelope or surface of the personal device or positioned at least partially on the surface of the envelope of the personal device.

Isolated Switch a switch that cannot be operated or affected by any entity or factor except an authorized user.

Independent operation—operation that cannot be affected by any entity or factor except an authorized user.

FIELD OF THE INVENTION

The presented invention is related to security of personal communication or computing devices with external communications and sensors (e.g. microphone, camera) features and using software for operation.

BACKGROUND OF THE INVENTION

Personal software operated devices or appliances (hereinafter "personal devices") such as mobile phones, IP-phones, pocket PCs, PDAs, laptop computers, desktop computers and network switches, use a variety of hardwired or wireless communication means for communication with other devices. A remote unauthorized user can adversely use these communication means to try and break the personal device security and obtain personal and other information on the personal device user or owner. A single personal device may have a number of different communication means such as phone-lines, cables, a wireless LAN, Bluetooth, etc, which only increases the security risk.

These communication means can be used to retrieve private information, audio/video information, user location information (track where user is located when personal device is using out communication) or transmitted information. Devices with permanently installed or accessory sensor components such as a microphone, earphone(s), speakers, camera, etc, are able to capture the information at a user location. Devices with permanently installed or accessory communication components like: modem, LAN adapter, Wireless LAN adapter, Bluetooth, GSM, etc, are able to transmit information and might reveal the user location. When signals are transmitted from the user location, the transmission can be used for tracking the user location. Components of a device/appliance that are controlled by software and electronic switching devices may be controlled by an unauthorized user even if they were disabled earlier by the authorized user. The components can be controlled without the user noticing the change in mode of operation. For example, a mobile phone may look "switched off" but still be functioning or even transmitting.

Local authorized or unauthorized users can easily modify the software operating the personal device, thereby causing a security breach, e.g. by downloading a virus affected software update. This scenario of software modification is very common: on one hand it is much easier than hardware modification, and on the other hand it is much harder to verify such modification or notice unwanted change.

At present, the problem of unauthorized access is handled by different types of security software such as firewalls, anti-virus programs, anti-spyware programs and security systems. However, each new software security system is eventually overcome by new hacking methods, viruses, worms, Trojans and other threats. This creates an endless competition between security providers and unauthorized users. In essence, software security is hard to implement and/or prove. Even if the theoretical model of the security is proven, there may still be a mistake or bug in the implementation that allows a break in the security. Consequently, software security solutions cannot be trusted.

Hardware security solutions are known and include: devices used to isolate telephone lines in order to prevent unauthorized capture of audio information from phone user (see U.S. Pat. No. 5,402,465 and US Pat. Application No. 20050271190); data line switches for computers that disconnect a computer line physically from the Internet, working in manual and/or automatic mode (US Pat. Application No. 20030062252); a power off method for a wireless peripheral device, which terminates power to all parts of the wireless device except the control chip by a certain operation on a connect button (US Pat. Application No. 20050009496); a switch that powers-on a PDA in response to the stylus being removed from the PDA's stylus holder, and, selectably, powers-off the PDA in response to the stylus being replaced into the PDA (U.S. Pat. No. 6,233,464); a mobile phone with two input modes, whereby a switch of input modes is attained by changing an electrical connection between the main printed circuit board (PCB) in the phone and the front and back PCBs (U.S. Pat. No. 7,031,758); the NetSafe Computer Security Switch, which uses a simple physical switching technology in a way that allows a computer or group of computers to quickly and easily block a communications signal from entering the computer(s) and restart the signal without any software and without the need to power down, reboot, or run software on the computer(s) (US Pat. Application No. 20040243825); a wireless button for a laptops, offered by the Hewlet Packard Corporation in its line of Pavilion laptops (hereinafter the "HP wireless button"), which enables or disables all integrated wireless components in the laptop (e.g. WiFi and Bluetooth), and a wireless light that indicates simultaneous the computer's overall wireless state (enabled or disabled); the portable electronic device that disconnects a receiving antenna from the duplexer of a mobile phone (US Pat. Application No. 2004/0203536A1).

All existing protection solutions suffer from one of two disadvantages: either the switch is "external" and can therefore be tampered with by an external factor, or the switch is internal but not fully isolated from the device itself (and therefore can be manipulated by the software of the device). Consequently, existing solutions cannot provide simultaneous temporary protection from audio/video information capture in device, cannot provide simultaneous temporary protection from both audio/video information capture and unauthorized access and user location\device location in device and cannot provide secure security mode exit, prevention of capture of the logic required for existing the security mode in device. Existing internal switches cannot provide prevention of false notification about the device security mode in device with already broken software security, i.e. in a state in which an unauthorized user gains access or control of the personal device despite software protection solutions.

There is therefore a widely recognized need for, and it would be highly advantageous to have a simple internally isolated hardware security solution for the users of the above mentioned personal devices that does not suffer from the above mentioned software and hardware solution disadvantages.

SUMMARY OF THE INVENTION

The present invention discloses hardware security solutions that overcome the problems of hardware and software security solutions mentioned above. The invention provides a user of a personal device with hardware means for protecting information such as private information, audio/video information, user location information or transmission information. The hardware means, referred to as "security switch" or "isolated switch" is internal to the personal device and is isolated, both "internal" and "isolated" being defined above. The "isolation" also means that the control elements of the switch do not have any external communication capability and are protected from remote operation/manipulation.

In some embodiments a security switch of the present invention is a component having: a) control elements that are not connected electrically to an environment from which they should be isolated and shielded, or that are decoupled in such a way that both electrical and magnetic fields cannot influence their operation; and b) switching elements that cannot be connected, disconnected or bypassed by elements other than the control elements in (a).

The security switch may be mechanical (electrical contacts switched mechanically) or electronic/electrical. When mechanical, its control is already isolated because it can be operated only by manual physical operation of the user, not by the device itself. A mechanically operated switch should not have an electrically operated bypass. When electronic/electrical, the security switch is isolated electrically, i.e. completely separated electrically from other elements or components of the personal device.

The principle of operation of the security switch disclosed herein relies solely on manual disconnection (or connection) of audio/video/communication or power supply components in the personal device in order to avoid unauthorized access to the information or personal device. This provides full isolation even in cases of full access to the device software or remote access to electronic components of the device, in the sense that an unauthorized user is not able to connect electrical circuits that are switched off manually.

Two main modes of operation are provided: Mode 1—manual switching by an authorized user (or simple "user") for preventing capture of audio/video information from the user; Mode 2—manual switching by the authorized user for preventing unauthorized determination of the user location or capture of other information. In mode 1, the user can receive visual information (for example incoming calls, SMS, memos, files, etc) yet is protected from being listened to, recorded or visually captured by unauthorized access to his personal device. In mode 2, the communication to the device is completely disconnected, so the device location cannot be discovered by any means and no information transfer is possible. There is also a possibility to combine modes 1 and 2 into a "combined mode". Note that mode 2 is not a substitute for mode 1, since in case of unauthorized access; audio/video information can be captured and stored in the device memory, then transmitted after the user exits mode 2.

The switch allows the user of a personal device to temporarily change the mode of operation when in need of privacy and wants to avoid possibility of spying after him/her by capturing his audio/video information or tracking his location. The usage of security switch that operates manually by the user provides the user a possibility to disconnect components that can capture audio/video and user input information or transmit signal from/to the user's personal device. When an electrical circuit is broken manually, it cannot be reconnected by an unauthorized user even in case of full access to the device software or by remote access to an electronic personal device. When all components capable of capture audio/video information—i.e. microphone(s), headphone(s), speaker(s), and camera(s) are disconnected, information cannot be obtained by an unauthorized user.

When all components capable of transmit signal from/to user's device/appliance—i.e. RF, WiFi, Bluetooth, NFC, and LAN are disconnected, the user location and other private information cannot be obtained by an unauthorized user.

Note that the present invention is not concerned with software security, but with protecting certain private information even in cases when security of device was already broken by disabling devices capable of capturing information or transmitting signal.

The protection is based on the idea of performing an operation that cannot be done by the software of the device or by the device itself, but only by the user (manual disconnection of the relevant components) and the operation is not known to the software of the device or the device itself.

According to the present invention there is provided a system for securing a personal device that includes a device core and at least one peripheral device from unauthorized access or operation, comprising an internal isolated switch having operating functions that cannot be affected by either the personal device core or the at least one peripheral device.

In some embodiments, the isolated switch includes an isolated disconnector for connecting and disconnecting the device core from the at least one peripheral device.

In some embodiments, the isolated switch includes electromechanical components.

In some embodiments, the isolated switch includes electrical components.

In some embodiments, the isolated switch includes electronic components.

In some embodiments, the isolated switch includes a combination of components selected from the group of a combination of electro-mechanical components with electrical components, a combination of electro-mechanical components with electronic components, a combination of electrical components with electronic components and a combination of electro-mechanical components with electrical components and electronic components.

In some embodiments, the isolated switch includes a switch mode indicator for providing a visual indication of a state of the switch.

In some embodiments, the at least one peripheral device includes at least one user input component and the isolated switch includes an isolated user input logic for reading user inputs.

In some embodiments, the at least one peripheral device includes at least one user input component and the isolated switch includes an isolated user input logic for reading user inputs and an isolated disconnector for disconnecting and connecting the device core from the at least one user input component.

In some embodiments, the isolated switch includes an input mode indicator for providing a visual indication of the input mode for the switch.

According to the present invention there is provided a system for securing a personal device that includes a device core and at least one peripheral device from unauthorized access or operation, comprising an internal isolated switch configured to operate independently of the personal device, wherein the switch includes an isolated disconnector for connecting and disconnecting the device core from the at least one peripheral device.

According to the present invention there is provided a method for securing a personal device that includes a device core and at least one peripheral device from unauthorized access or operation, comprising the steps of providing an internal isolated switch having operating functions that cannot be affected by either the personal device core or the at least one peripheral device and using the isolated switch to protect the device from unauthorized use or access.

In some embodiments of the method, the step of providing an internal isolated switch includes providing an isolated disconnector for connecting and disconnecting the device core from the at least one peripheral device.

In some embodiments of the method, the method further comprises the step of providing a switch mode indicator coupled to the isolated disconnector, for providing a visual indication of a state of the isolated disconnector.

In some embodiments of the method, the step of using includes disconnecting, by an authorized user, the device core from the at least one peripheral device in response to a threat detection or preemptively.

In some embodiments of the method, the method further comprises the step of providing an isolated user input logic for reading user inputs into the isolated switch.

In some embodiments of the method, the method further comprises the step of providing a user input indicator for providing a visual indication of an input logic state.

BRIEF DESCRIPTION OF THE DRAWINGS

Reference will be made in detail to preferred embodiments of the invention, examples of which may be illustrated in the accompanying figures. The figures are intended to be illustrative, not limiting. Although the invention is generally described in the context of these preferred embodiments, it should be understood that it is not intended to limit the spirit and scope of the invention to these particular embodiments. The structure, operation, and advantages of the present preferred embodiment of the invention will become further apparent upon consideration of the following description, taken in conjunction with the accompanying figures, wherein:

FIG. 10 shows an example of electrical implementation of an isolated switch;

FIG. 11 shows another example of an electrical implementation of an isolated switch;

FIG. 12 shows an example of electrical/electronic implementation of an isolated switch;

DETAILED DESCRIPTION OF INVENTION

The present invention discloses security systems and devices for protecting personal devices and their users from unauthorized access, operation, identity theft or information theft. In particular, the invention discloses a security switch that provides total protection of information related to the personal device or a user of the device. In the following description, like elements appearing in different figures are numbered identically.

Figure 1:
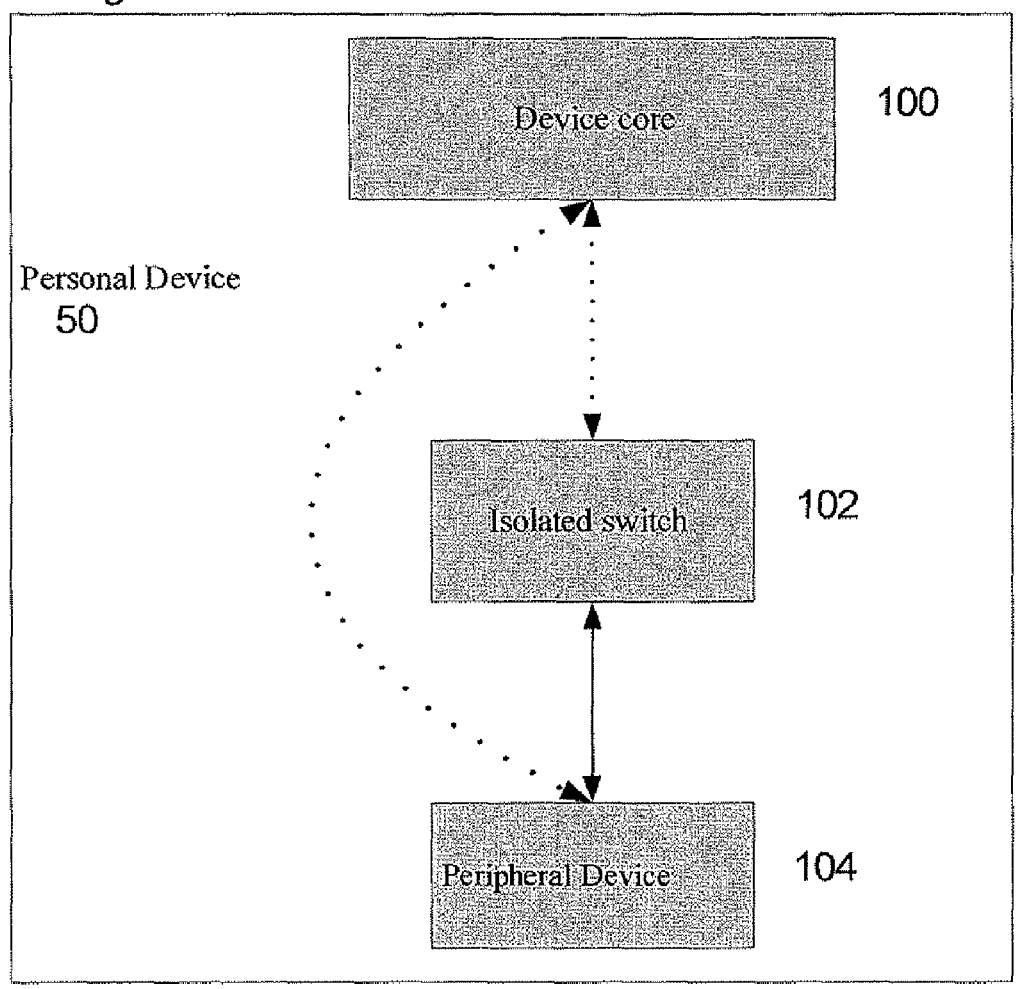
FIG. 1 shows a first embodiment of a personal device with a security switch of the present invention.

FIG. 1 shows a first embodiment 50 of a personal device with a security switch of the present invention. Personal device 50 includes a device core 100, an isolated switch 102 and at least one peripheral device 104. The dotted arrows indicate an optional direct connection between device core 100 and peripheral device 104 and/or between device core 100 and isolated switch 102. Device core 100 operates by software and may include one or more controllers (e.g. central processing units (CPUs)), one or more memory units and one or more power management modules. A peripheral device 104 may include one or more communication components, and/or one or more sensor components, and/or one or more user input components. Each of these will be shown in following figures. The communication components may include wireless communication components or wired communication components (e.g. WiFi, RE, Bluetooth, NFC, LAN, and modem). The sensor components may include audio components, video components (e.g. a microphone, speaker or camera). The user input component may include a keyboard or a touch screen.

Isolated switch 102 is a key inventive element of the present invention, which contrasts with prior art in terms of both structure and function. Isolated switch 102 is an internal component, isolated from other components of the personal device. As defined above, "internal" means enclosed within an envelope of the personal device or positioned at least partially on the surface of the envelope of the personal device. "Isolated" means that the operation of the security switch cannot be affected either directly or indirectly by device core 100 or peripheral devices 104. This isolation prevents manipulation of switch 102 by the software of the personal device. In short, switch 102 can perform operations independently from the personal device (i.e. the personal device cannot affect an operation performed by switch 102) and can operate either in parallel with device core 100 (meaning that both perform independent tasks, in which case there may be a direct connection between device core 100 and peripheral device 104), or as a "man in the middle", meaning that the connection of device core 100 with peripheral devices 104 or the information passed therebetween is affected by the operation of the switch.

Isolated switch 102 may be implemented in a number of different ways: by electro-mechanical components, by electrical components, by electronic components or a combination of the above.

Isolated switch 102 is different from similar prior art components as follows: the HP wireless button not fully isolated, because some of the HP button subcomponents (e.g. an indicator) are operated by the laptop, and other subcomponents are not proven to be without a bypass and without access to its control element. In contrast, switch 102 is completely isolated from the personal device in which it is integrated. The HP wireless button operates only as "man in the middle", while isolated switch 102 can operate in parallel as well. The portable electronic device in US Patent Application No. 2004/0203536A1 is also not "isolated" in the sense defined herein, because it disconnects only the receiving antenna from the duplexer, while the transmitting antenna is still Functional and may provide a bypass. In contrast, switch 102 is completely isolated from the personal device in which it integrated with no possibility of bypass. The portable electronic device operates only as a "man in the middle", while isolated switch 102 can operate in parallel as well. The NetSafe switch (US Pat. Application No. 20040243825) is an external device, while switch 102 is internal. The circuit power reduction scheme (US. Pat. Application No. 2006/0066370 uses micro-electro-mechanical switches and is not isolated (in fact, it is operated by the logic of the device), meaning that the circuit power reduction scheme using micro-electro-mechanical switches can be manipulated by the software of the device. In contrast, switch 102 is isolated and cannot be operated or manipulated by the logic of the personal device.

Figure 2:
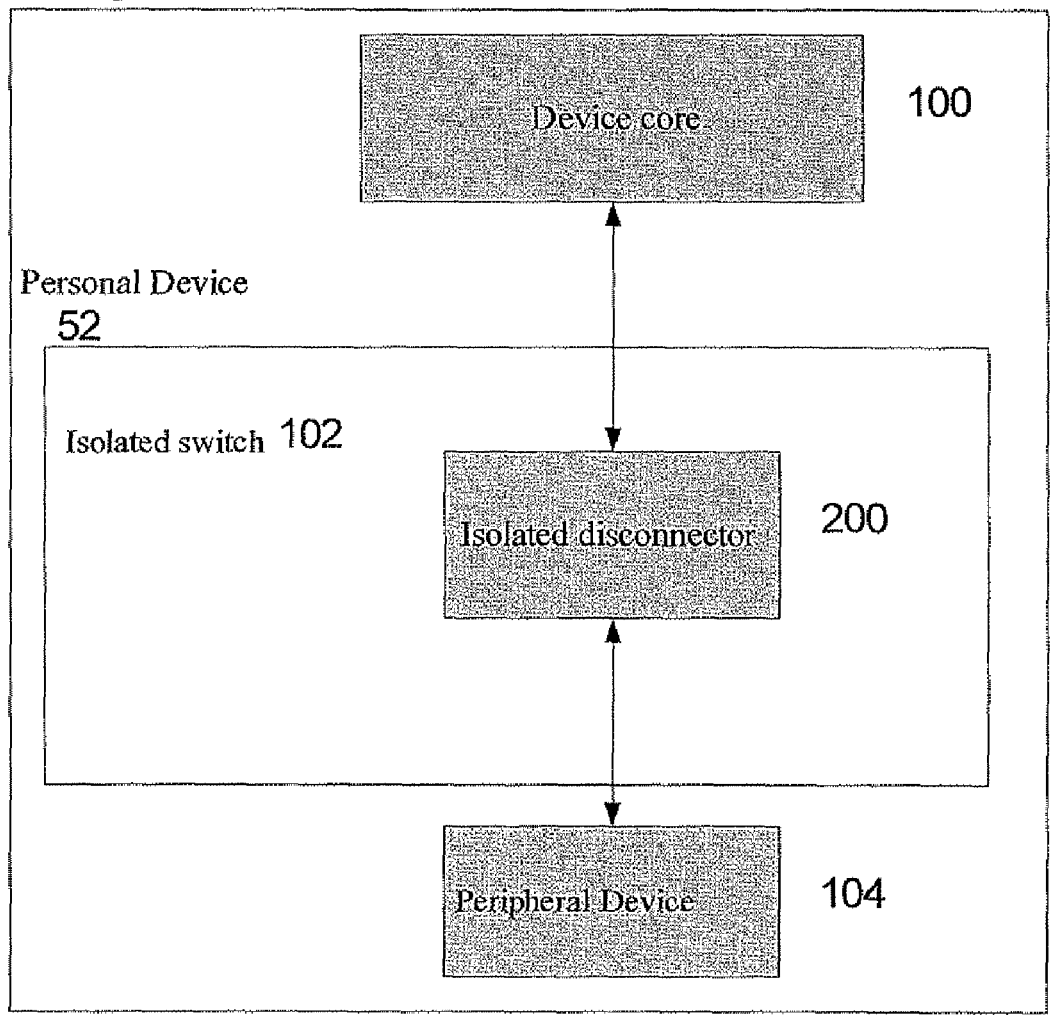
FIG. 2 shows another embodiment of a personal device with a security switch of the present invention.

FIG. 2 shows a second embodiment 52 of a personal device with a security switch of the present invention. In addition to all the components of device 50, in device 52, isolated switch 102 includes a disconnect/connect component. ("disconnector") 200. Disconnector 200 is a key inventive sub-component of the present invention, which contrasts with prior art in terms of both structure and function. It is an internal, isolated (in the sense defined above for switch 102) sub-component, which can disconnect and reconnect different subsets of peripheral devices 104 from the device core. The disconnect operation may be effected by disconnecting (cutting) essential links between the device core and the subset of peripheral devices 104 (e.g. a data line, a power supply line, etc) or by shorting electrically essential links in the subset of peripheral devices 104 (e.g. a data line, sensor terminals, etc). Disconnector 200 may be implemented in a number of different ways: by electrical contacts switched mechanically, by electrical components, by electronic components or a combination of the above.

Exemplarily, the security switch is used as follows: when a threat to an authorized user's privacy or to the personal device security is detected by the user or when the user wishes to perform preventive measures: disconnector 200 is operated by the user to disconnect the relevant subset of peripheral devices 104 from the device core. When the user detects that the threat is over or that preventive measures are not required, he/she operates disconnector 200 to restore the connection of the disconnected subset of peripheral devices 104 to the device core. Alternatively, disconnector 200 is operated by the user to connect the relevant subset of peripheral devices 104 to the device core. When the user detects that the threat is over or that preventive measures are not required anymore, he/she operates disconnector 200 to disconnect (back) the connected subset of peripheral devices 104 from the device core.

Isolated disconnector 200 is different from the HP wireless button, in that the HP wireless button enables or disables all integrated wireless devices simultaneously, while disconnector 200 can disconnect a subset of such devices. The HP wireless button enables/disables all integrated wireless peripheral devices at once and disconnection of a subset of these devices is enabled only by the laptop software. The HP wireless button may not be isolated. In inventive contrast, disconnector 200 is capable of disconnecting any predefined subset of peripheral devices 104 (which includes not only wireless peripheral devices e.g. wired peripheral devices, sensor devices) and is isolated from the personal device in which it integrated. Disconnector 200 is different from the portable electronic device in that this device connects/disconnects only a receiving signal (of RF communication), which still allows sending information from the device by an unauthorized user. In contrast, disconnector 200 can disconnect any predefined subset of peripheral devices (including the RF receiving signal, among others), not limited to communication devices, thereby providing a mode in which sending information from the device by unauthorized user is impossible.

Isolated disconnector 200 is different from the NetSafe switch (US Pat. Application No. 20040243825); in that the NetSafe switch is an external device which disconnects only wired communications, while disconnector 200 is internal and capable of disconnecting any predefined subset of peripheral devices 104 (which includes not only wired peripheral devices).

Isolated disconnector 200 is different from the circuit power reduction scheme (US. Pat. Application No. 2006/0066370); in that the circuit power reduction uses micro-electro-mechanical switches and is not isolated (in fact, it is operated by the logic of the device), meaning that the circuit power reduction scheme using micro-electro-mechanical switches can be manipulated by the software of the device. In contrast, disconnector 200 is isolated and cannot be operated or manipulated by the logic of the personal device. The circuit power reduction in US. Pat. Application No. 2006/0066370 can only disconnect the logic block elements, while disconnector 200 is capable of either disconnecting or shorting peripheral devices 104.

Figure 3:
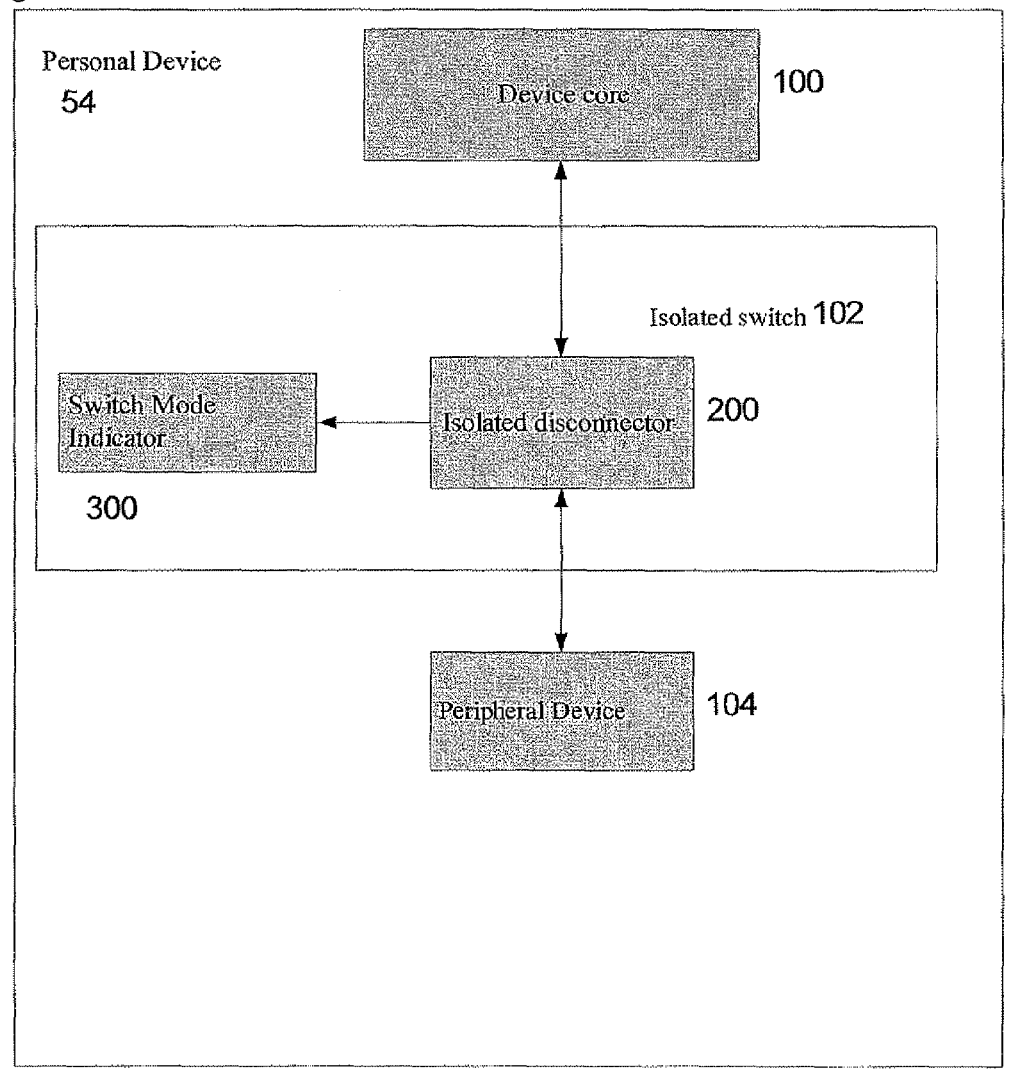
FIG. 3 shows yet another embodiment of a personal device with a security switch of the present invention.

FIG. 3 shows another embodiment 54 of a personal device with a security switch of the present invention. Device 54 includes in addition to all the components of device 52 a switch mode indicator (e.g. a LED) 300. Indicator 300 provides visual indication of the state of disconnector 200, i.e. a visual indication of the disconnected subset of peripheral devices 104 or an indication that none of peripheral devices 104 are disconnected by disconnector 200. The switch mode indicator is "isolated" in the same sense as disconnector 200 and controlled only by disconnector 200 which contrasts with prior art in terms of structure. This prevents manipulation of indicator 300 by the software of the personal device or by other means, meaning that false indication or notification is impossible.

In use, under the same circumstance as described for device 52, the security switch is used as follows: Disconnector 200 is operated by the user to disconnect the relevant subset of peripheral devices 104 from the device core. The disconnector then enables indicator 300, which is used by the user to visually verify the desired mode of security switch. When the user detects that the threat is over or that preventive measures are not required, he/she operates disconnector 200 to restore the connection of the disconnected subset of peripheral devices 104 to the device core. Disconnector 200 then disables the indicator 300, which is used by the user to visually verify again the desired mode of security switch.

Switch mode indicator 300 is different from an indicator in the HP wireless button, in that the HP wireless button indicator is not isolated from the laptop and controlled as well by the laptop software, while indicator 300 is isolated from the personal device in which it integrated. The wireless button indicator may provide false notification/indication (e.g. due to software manipulation), while indicator 300 is controlled only by disconnector 200, which prevents false notification/indication.

Figure 4:
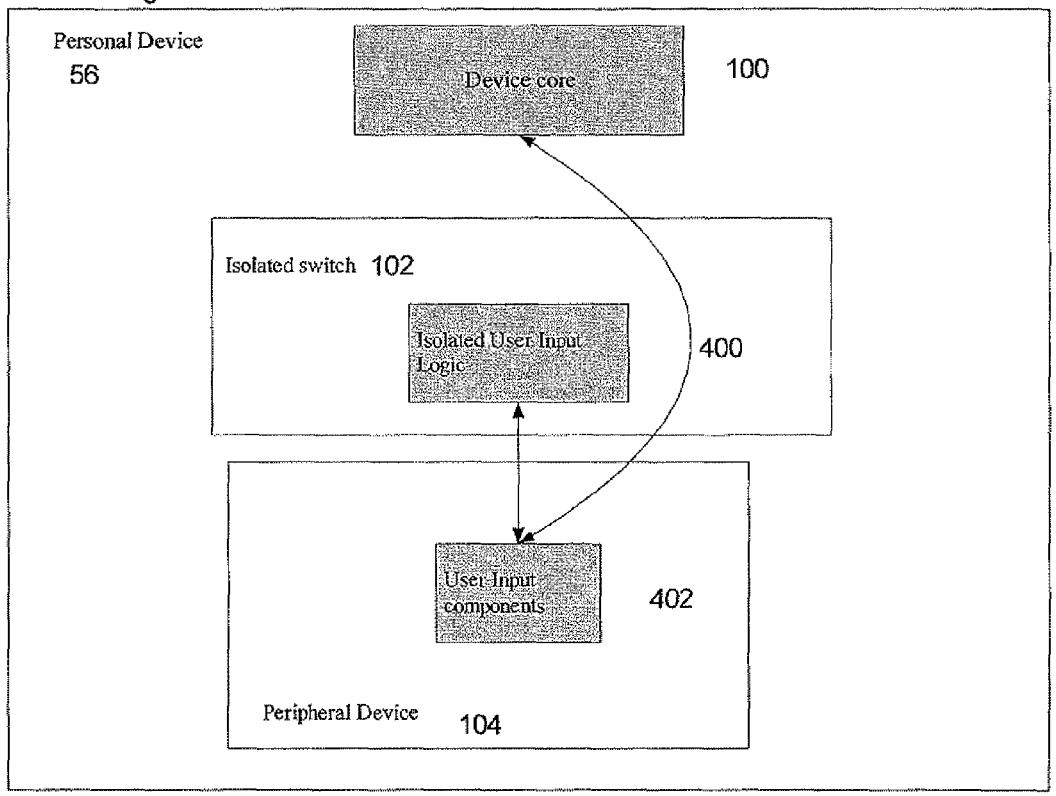
FIG. 4 shows yet another embodiment of a personal device with a security switch of the present invention.

FIG. 4 shows yet another embodiment 56 of a personal device with a security switch of the present invention. Device 56 includes in addition to all the components of device 50 an isolated user input logic 400 (or simply "logic") as a component of isolated switch 102 and at least one user input component 402 included in at least one of peripheral devices 104. A component 402 may be any known input component such as a keyboard or a touch screen.

Isolated user input logic 400 is a second key inventive sub element of the present invention, which contrasts with prior art in terms of both structure and purpose. Logic 400 is an internal isolated component (in the sense defined above for switch 102) used for reading inputs, which is hooked to at least one subset of user input components 402 in parallel with and separately from device core 100. The hook-up may be done exemplarily by using keys with a mutual mechanical part and independent electrical contacts. Logic 400 is isolated from other components of the personal device in the sense that the inputs read from user input components 402 cannot be affected either directly or indirectly by device core 100 or by peripheral devices 104. This isolation prevents manipulation of logic 400 by the software of the personal device.

Logic 400 may have different implementations depending on the user input component(s) 402 to which it is hooked.

In use, when a user wants to enter an input to the security switch (e.g. by pressing keys on the keyboard) the input is entered by operating a user input component 402 to enter the input for security switch and logic 400 reads the input from component 402 in an independent operation (i.e. independently from device core 100).

Figure 5:
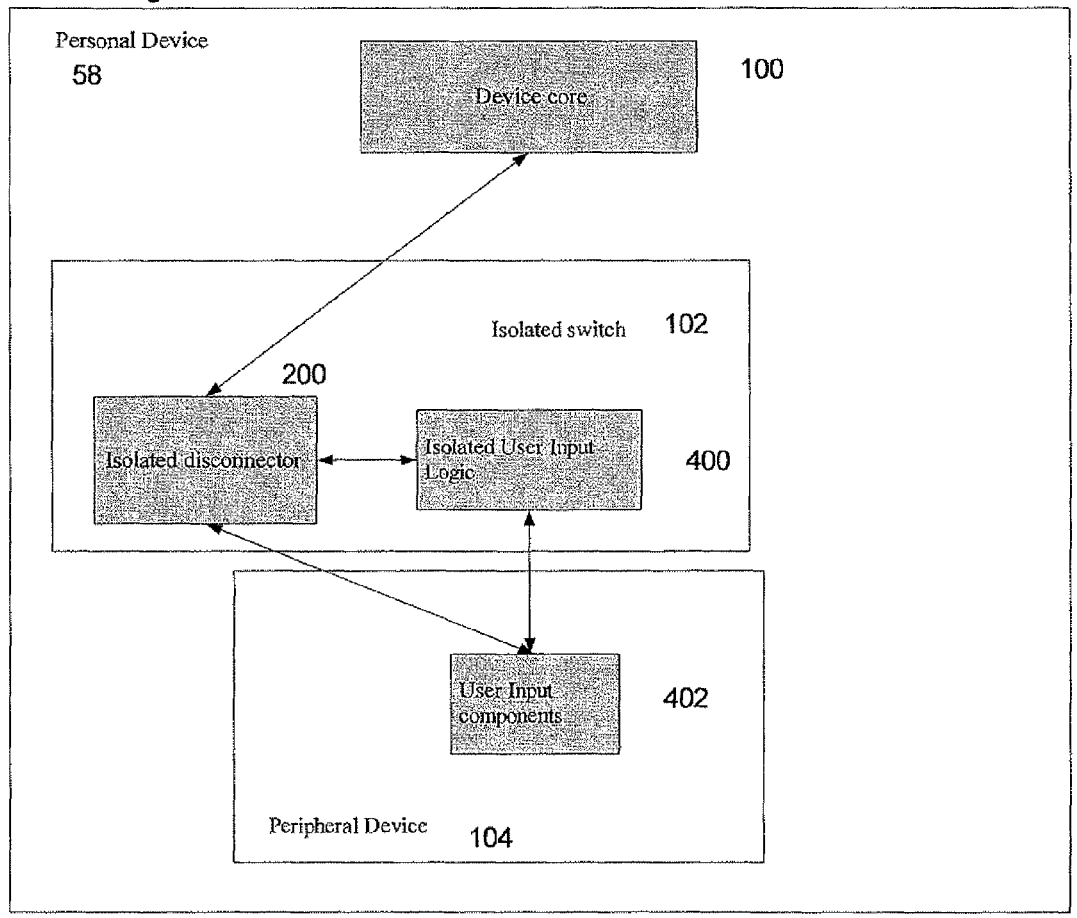
FIG. 5 shows yet another embodiment of a personal device with a security switch of the present invention.

FIG. 5 shows yet another embodiment 58 of a personal device with a security switch of the present invention. Device 58 includes in addition to all the components of device 56 an isolated disconnector 200. In contrast to device 52, disconnector 200 in device 58 disconnects and reconnects only different subsets of user input components 402 from the device core, for preventing inputs from reaching device core 100. This prevents unauthorized input capture by the software of the personal device or by other means (e.g. a keyboard sniffer), meaning that the input is secured. In use, under the same circumstance as described for device 56, a user input component 402 is operated by the user to enter an initial input for the security switch. Logic 400 reads the initial input as an independent operation and operates disconnector 200 to disconnect the respective user input component from the device core (for enabling continued input in a secure environment, e.g. secure input of a user PIN code). The user input component is then operated by the user to continue entering inputs for the security switch as an independent operation (while the input cannot be captured by any entity except the security switch). At the end of the input operation, logic 400 operates disconnector 200 to restore the connection of the disconnected subset of user input components 402 to device core 100.

Figure 6:
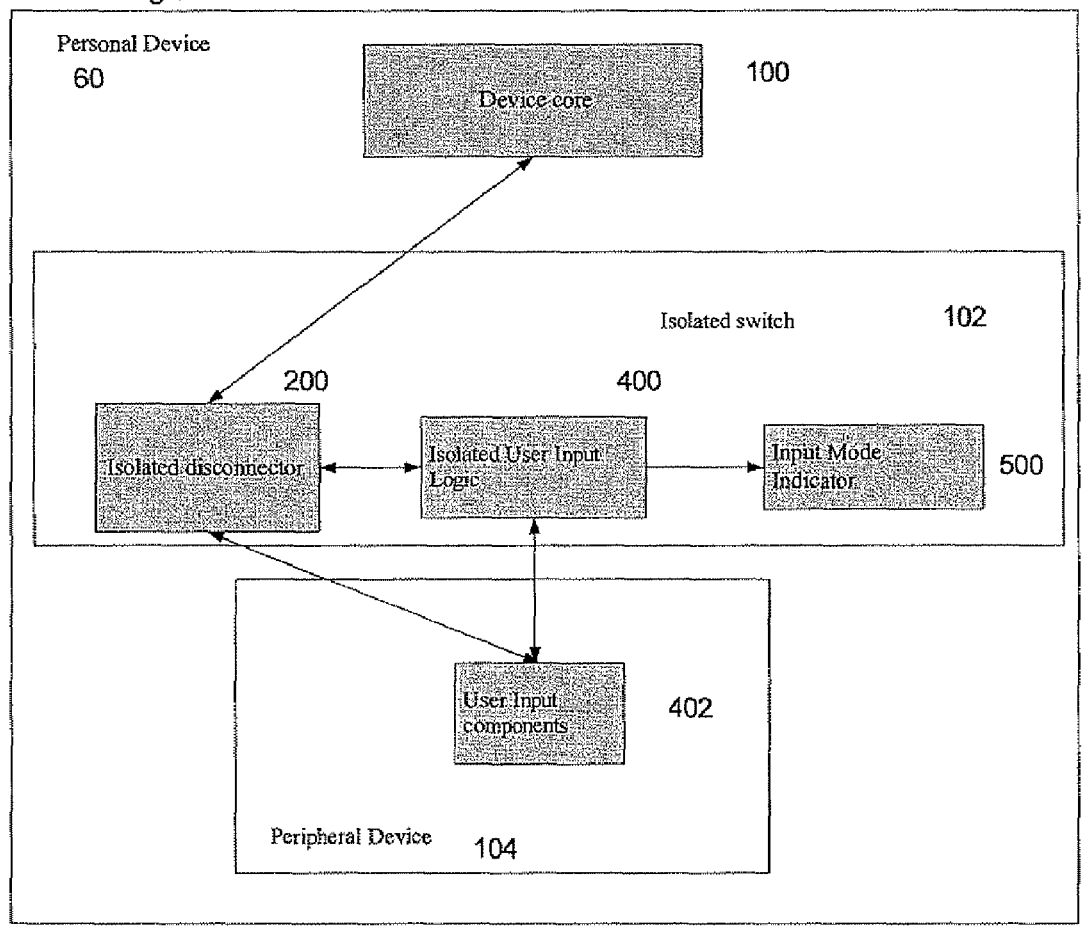
FIG. 6 shows an embodiment of a personal device with an input solution for security switch of the present invention.

FIG. 6 shows an embodiment 60 of a personal device with an input solution for security switch of the present invention. Device 60 includes in addition to all the components of device 58 an input mode indicator (e.g. a LED) 500. Indicator 500 provides visual indication of the state of logic 400, i.e. a visual indication that logic 400 operates disconnector 200 to disconnect user input components 400 from device core 100, or an indication that none of user input components 400 are disconnected by logic 400 via disconnector 200. The switch mode indicator is "isolated" in the same sense as logic 400 and controlled only by logic 400 which contrasts with prior art in terms of structure. This prevents manipulation of indicator 500 by the software of the personal device or by other means, meaning that false indication or notification is impossible. Under similar use circumstances as described for device 58, the security switch is used as follows: User input component 402 is operated by the user to enter an initial input for security switch. Logic 400 reads the initial input from user input component 402, operates disconnector 200 to disconnect input component 402 from device core 100 (for enabling continued input in a secure environment) and enables indicator 500. Indicator 500 is used by the user to visually verify a secure input environment. Input component 402 is operated by the user to continue entering inputs to the security switch. At the end of input operations, logic 400 operates disconnector 200 to restore the connection of input component 402 to device core too and disables indicator 500. Indicator 500 is then used by the user to visually verify the restoration of the input environment to the initial state.

Figure 7:
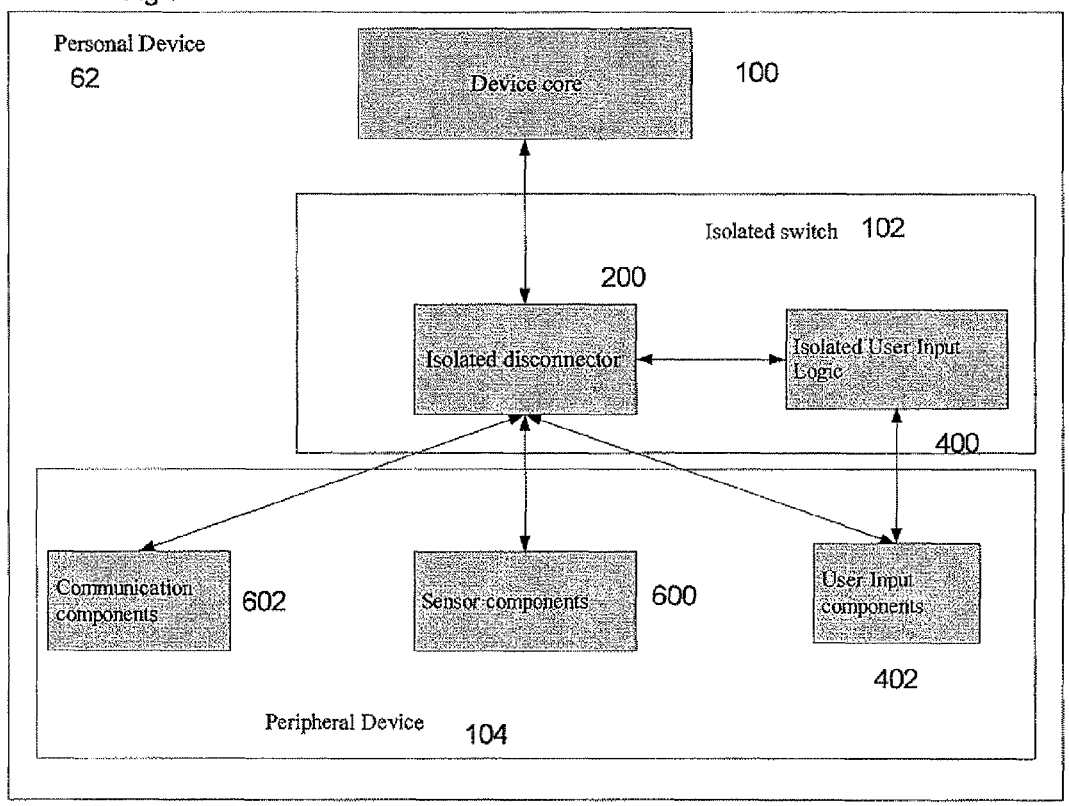
FIG. 7 shows yet another embodiment of a personal device with a security switch of the present invention.

FIG. 7 shows yet another embodiment 62 of a personal device with a security switch of the present invention. Device 62 combines device 52 and device 58, where peripheral devices 104 (described in device 50) include user input components 402 (described in device 56), communication components 602 and sensor components 600 (described in device 50 as sub-parts of peripheral devices 104). Device 62 provides functionalities of both device 52 and device 58.

Figure 8:
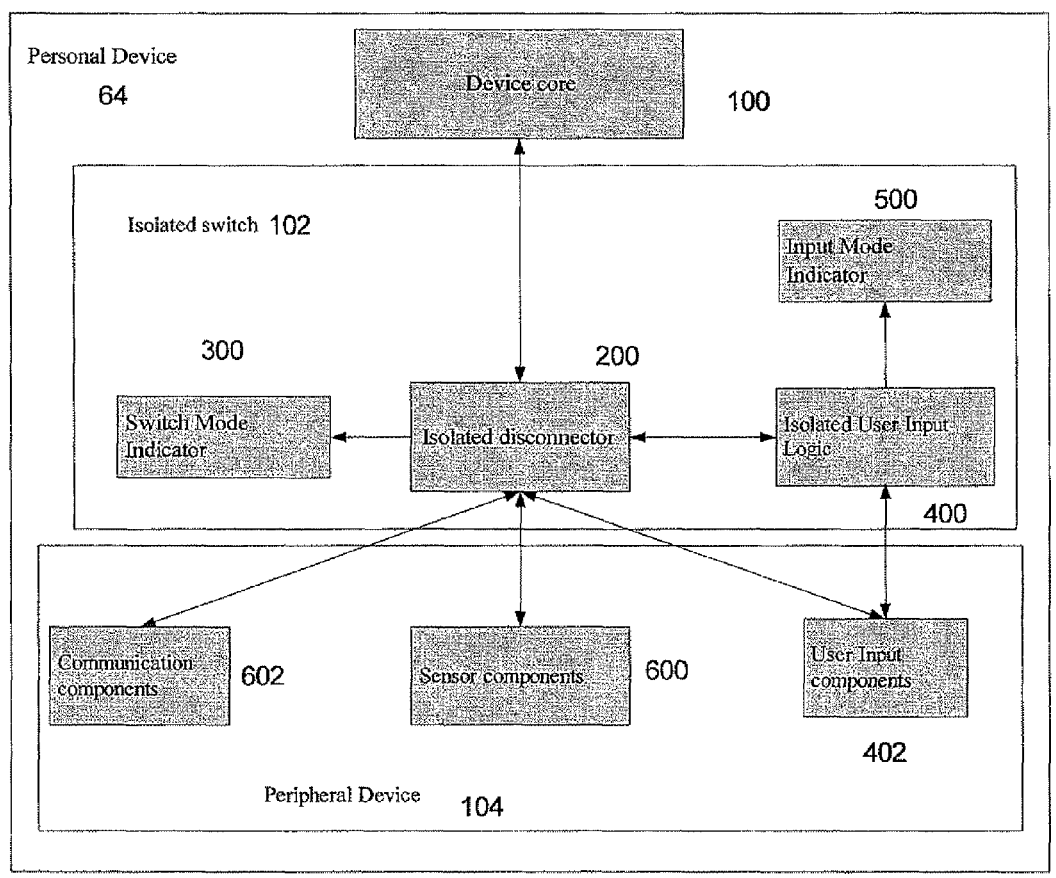
FIG. 8 shows yet another embodiment of a personal device with a security switch of the present invention.

FIG. 8 shows yet another embodiment 64 of a personal device with a security switch of the present invention. Device 64 combines device 54 and device 60 where peripheral devices 104 (described in device 50) include user input components 402 (described in device 56), communication components 602 and sensor components 600 (described in device 50 as sub-parts of peripheral devices 104). Device 64 provides functionalities of both device 54 and device 60.

Figure 9:
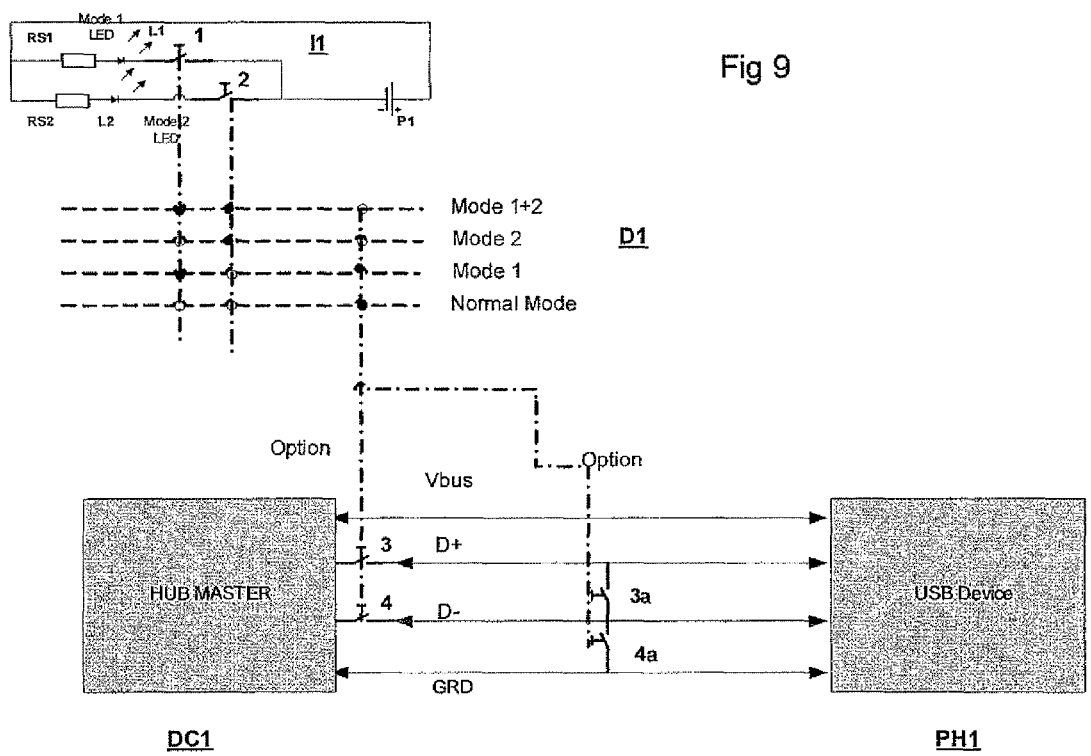
FIG. 9 shows an example of an electro-mechanical implementation of an isolated switch.

FIG. 9 shows an example of an electro-mechanical implementation of an isolated switch 102, which includes disconnector 200 and switch mode indicator 300. FIG. 9 includes DC1 as device core 100, PH1 (USB Device) as communication component 602 D1 (Hub Master) as an electro-mechanical implementation of disconnector 200 and I1 as an electrical implementation of indicator 300. D1 is a multi-positional switch that has four states: normal, mode 1, mode 2 and mode 1+2. The "normal" mode of D1 includes open contacts 1, 2 and closed contacts 3, 4 (or normally opened contacts 3a, 4a). If D1 is in normal mode, DC1 is connected to PH1 and the circuits of L1 and L2 of I1 are open, meaning that the LEDs of mode 1 and mode 2 are off. When D1 is in "mode 1", contacts 3, 4 (or 3a, 4a) remain in same state as in normal mode (due to the fact that communication component 602 is not affected by mode 1), and contact 1 closes the connecting power from P1 through a resistor RS1 to L1, which turns on the LED of mode 1.

When D1 is in "mode 2" contacts 3, 4 open and disconnect the data line between DC1 and PH1 (or contacts 3a, 4a shorten data lines D+, D− to ground) and contact 2 closes, connecting power from P1 through a resistor RS2 to L2, which turns on the LED of mode 2. When D1 is in "mode 1+2", contacts 3, 4 open and disconnect the data line between DC1 and PH1 (or contacts 3a, 4a short data lines D+, D− to ground) and contacts 1, 2 close, connecting power from P1 through RS1, RS2 to L1, L2, which turns on the LEDs of modes 1 and 2.

Switch 102 is isolated because D1 operates mechanically and its control cannot be affected by DC1 or PH1. There is no bypass to data lines D+, D−, so when contacts 3, 4 open (3a, 4a close), communication between PH1 and DC1 is disconnected without possibility of bypass.

FIG. 10 shows an example of electrical implementation of isolated switch 102 which includes disconnector 200 (represented by D2), switch mode indicator 300 (represented by I1) and isolated user input logic 400 (represented by K1). D2 is implemented via a relay R. I1 is implemented via a switch mode LED (as shown in FIG. 9) and K1 is implemented by independent Keys 1, 2, 3.

When Key 1 and Key 2 are pressed simultaneously, relay R operates and opens contacts to the circuit(s) that have to be interrupted, closes contact R and stays energized while Key 3 is in normal position and turns on the LED. When key 3 is pressed, relay R is released and interrupted circuit(s) return to normal state.

Switch 102 is isolated because the relay R coil and K1 (which are the control elements of D2) are not electrically connected to any other components and are not adjacent to any other components or are shielded from other components, so they cannot be operated directly or indirectly (cross-talk) by other components. There is no bypass to circuits interrupted by relay R.

FIG. 11 shows another example of an electrical implementation of isolated switch 102 which includes disconnector 200 (represented by D3), switch mode indicator 300 (represented by I1) and isolated user input logic 400 (represented by K2). D3 is implemented via a latch relay LR3. I1 is implemented via a LED. K2 is implemented by independent Keys 1, 2, 3, 4 and latch relays LR1 and LR2.

When Keys 1, 2, 3 are pressed in this exact order, latch relay LR3 operates and opens contacts to the circuit(s) that have to be interrupted and turns on the LED. Latch relays LR1, LR2 and LR3 stay in latched mode until key 4 is pressed. When key 4 is pressed, the interrupted circuit(s) returns to normal state.

Switch 102 is isolated because the relay LR3 coil and K2 (which are the control elements of D3) are not electrically connected to any other components and are not adjacent to any other components or are shielded from other components, so they cannot be operated directly or indirectly (cross-talk) by other components. There is no bypass to circuits that are interrupted by latch relay LR3.

FIG. 12 shows an example of electrical/electronic implementation of isolated switch 102, which includes disconnector 200 (represented by D2), switch mode indicator 300 (represented by I1), isolated user input logic 400 (represented by K3) and input mode indicator 500 (represented by I2). D2 is implemented via relays R1 and R2, I1 is implemented via LED L1, and I2 is implemented via LED L2 (same as L1) and K3 is implemented as independent hooks to existing Keys 0, 1, 2, 3, 4, 5 (while Key 5 has two contacts), Flip-flops FL1, FL2, FL3, FL4, FL5, FL6 and One-Shots ON1, ON2, ON3, ON4 and ON5.

When key 0 is pressed, FL1 changes state and operates R1, which disconnects the required subset of peripheral devices 104 and turns on L1, meaning the security switch enters a "secure mode". For exiting the secure mode, the user presses Key 1, which activates ON1 to send a signal to FL3. FL3 changes state and enables operation of FL4. The user then presses Key 2, which activates ON2 to send a signal to FL4. FL4 changes state, enables operation of FL5 and activates FL2. FL2 changes state and operates R2. R2 disconnects the main keyboard from device core 100 and turns on L2 (now the security switch has a secure input). The user then presses Keys 3 and 4 in that exact order, which causes FL5, then FL6 and then FL1 to change state and to release R1. R1 reconnects the previously disconnected subset of peripheral devices 104, turns off L1 and connects the ground to Key 5 (second contact). Key 5 is used to reset the flip-flop sequence FL3, FL4, FL5, FL6 for reentering the key sequence, and causes FL2 to change state and release P2. R2 then reconnects the main keyboard and turns off L2, meaning the security switch returns to normal mode.

Switch 102 is isolated because the relay R1 coil, relay R2 coil and K3 (which are the control elements of D2) are not connected electrically to any other components and are not adjacent to any other components, or are shielded from other components (keys 0, 1, 2, 3, 4 are connected to main keyboard only mechanically), so they cannot be operated directly or indirectly (cross-talk) by other components. There is no bypass to circuits that are interrupted by relay R1 and R2.

Figure 13:
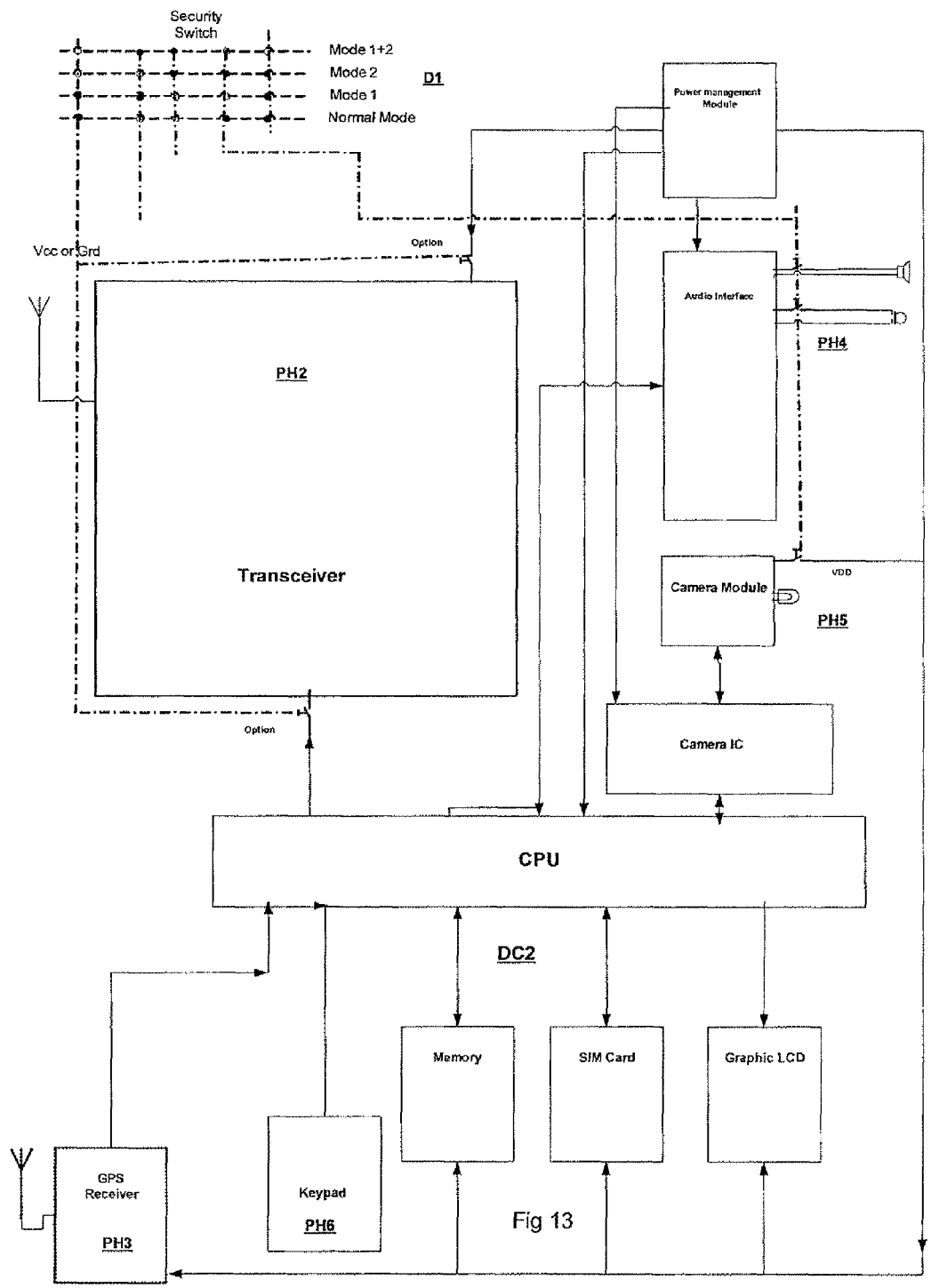
FIG. 13 shows an example of an electro-mechanical implementation of an isolated switch.

FIG. 13 shows an example of an electro-mechanical implementation of isolated switch 102 which includes disconnector 200 (represented by D1) in a mobile terminal (e.g. mobile phone). The mobile phone includes a device core 100 (represented by DC2) with a CPU, a Memory, a SIM Card, a Graphic LCD, a Camera IC, an Audio Interface, and a Power management module; PH2, PH3 representing communication components 602; a transceiver PH2 and a GPS receiver PH3; PH4 and PH5 representing sensor components 600; and PH6 as user input component 402. PH4 consists of a microphone and a speaker, PH5 consists of a camera and PH6 consists of keyboard. All components and subcomponents are interconnected as shown.

In mode 1, D1 disconnects PH4 and PH5. In mode 2, D1 disconnects PH2 (for disconnecting PH2, D1 can disconnect the power module or the CPU from PH2). In mode 1+2, D1 disconnects PH4, PH5 and PH2. However, PH3 and PH6 are not affected by the modes of the security switch.

Figure 14:
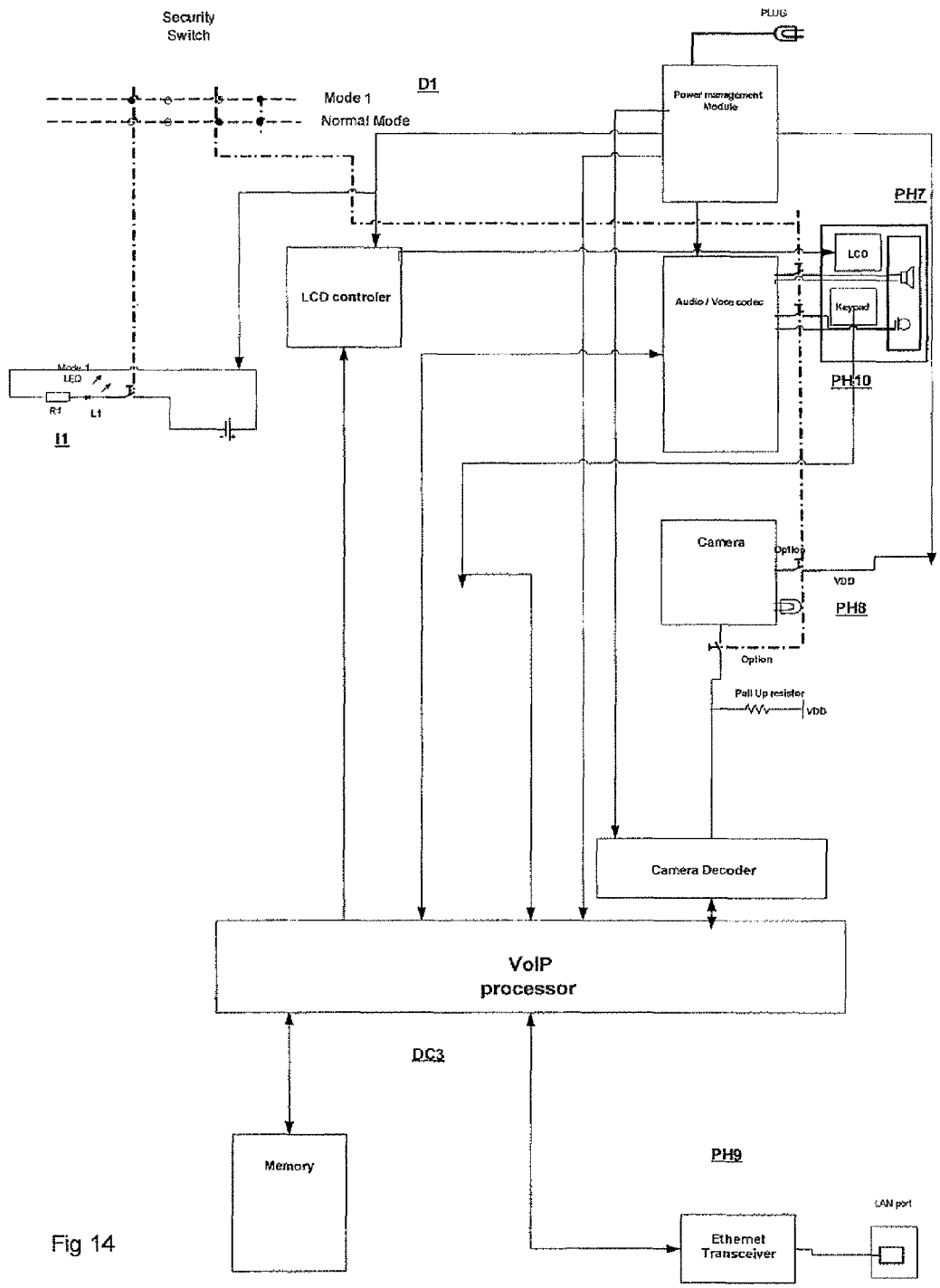
FIG. 14 shows an example of an electro-mechanical implementation of isolated switch.

FIG. 14 shows an example of an electro-mechanical implementation of isolated switch 102, which includes disconnector 200 (represented by D1) and switch mode indicator 300 (represented by I1) in an IP-Phone. The IP phone includes a device core 100 (represented by DC3) with a VoIP processor, a Memory, an Audio/Voice Codec, a Power Module, a LCD controller, a LCD, a Camera Decoder, PH7, PH8 representing sensor components 600, PH9 representing communication component 602 and PH10 representing user input component 402. PH7 consists of a microphone and a speaker, PH8 consists of a camera, PH9 is an Ethernet transceiver, and PH10 consists of keyboard. All components and subcomponents are interconnected as shown.

The security switch has only one mode (mode 1), due to the fact that mode 2 and mode 1+2 are not required in this implementation. In mode 1, D1 disconnects PH8 and PH7 and activates I1. As shown (FIG. 14), a pull-up resistor can be used to protect the open circuit between PH8 and DC2 while in mode 1.

Examples of predefined subsets of sensor components 600 that can be disconnected by disconnector 200 in mode 1 include:
1. Microphone, speaker and camera, e.g. in a mobile phone.
2. Microphone and camera (in case that the speaker is proved to be unable to capture voice, it is possible to leave it connected and to gain more functionally) e.g. in mobile phone.

Examples of predefined subsets of communication components 602 that can be disconnected by disconnector 200 in mode 2 include.
1. RF communication, e.g. in mobile phone.
2. Bluetooth, infra-red and\or NFC (Near Field Communication) e.g. in a mobile phone where NFC might be used for PayPass (Electronic Payment) and Bluetooth\Infra-Red might be used for data transfer.
3. WiFi, Wimax, e.g. in a laptop computer.

Examples of user input logic 400 hooks:
1. Hook to the "end call" button and "start call" button e.g. in a mobile phone.
2. Hook to the integrated cover, meaning that operation will be initiated by closing\shifting the cover e.g. in a mobile phone or laptop computer.
3. Hook to the keyboard, meaning that operation will be initiated by the user pressing a combination or sequence of keys, e.g. in a mobile phone.
4. Hook to the "mute mode" button, e.g. in an IP-Phone.
5. Hook to the handset placement, meaning that operation will be initiated by the user plug in/out the handset e.g. in an IP-Phone.
6. Hook to the stylus holder, meaning that operation will be initiated by the user placing the stylus back in the stylus holder and/or removing the stylus from the stylus holder e.g. in a Pocket PC\PDA.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission reference is available as prior art to the present invention.

While the invention has been described with respect to a limited number of embodiments, it will be appreciated that many variations, modifications and other applications of the invention may be made. Those skilled in the art will appreciate that the invention can be embodied by other forms and ways, without losing the scope of the invention. The embodiments described herein should be considered as illustrative and not restrictive.

What is claimed is:

1. A system for securing a personal device that includes a device core and at least one peripheral device from unauthorized access or operation, comprising an internal isolated switch having operating functions that cannot be affected by either the personal device core or the at least one peripheral device, wherein the switch is selected from the group consisting of a mechanical switch without an electrically operated bypass and an electronic/electrical switch separated electrically from elements or components of the personal device.

2. The system of claim 1, wherein the isolated switch includes an isolated disconnector for connecting and disconnecting the device core from the at least one peripheral device.

3. The system of claim 1, wherein the isolated switch includes a switch mode indicator for providing a visual indication of a state of the switch.

4. The system of claim 3, wherein the indicator is a light emitting device.

5. The system of claim 2, wherein the at least one peripheral device includes a plurality of peripheral devices, and wherein the isolated disconnector can disconnect and connect any subset of the plurality of peripheral devices.

6. The system of claim 1, wherein the at least one peripheral device includes a user input component and wherein the isolated switch includes an isolated user input logic for reading user inputs.

7. The system of claim 2, wherein the at least one peripheral device includes a user input component coupled to the isolated disconnector and wherein the isolated switch includes an isolated user input logic for reading user inputs.

8. The system of claim 7, wherein the isolated switch further includes an input mode indicator for providing a visual indication of a state of the switch.

9. The system of claim 1, wherein the peripheral device is selected from the group of devices consisting of mobile phones, IP-phones, pocket PCs, PDAs, laptop computers, desktop computers and network switches.

10. A system for securing a personal device that includes a device core and at least one peripheral device from unauthorized access or operation, comprising an internal isolated switch configured to operate independently of the personal device, wherein the switch is selected from the group consisting of a mechanical switch without an electrically operated bypass and an electronic/electrical switch separated electrically from elements or components of the personal device and wherein the switch includes an isolated disconnector for connecting and disconnecting the device core from the at least one peripheral device.

11. The system of claim 10, wherein the isolated switch further includes a switch mode indicator for indicating a status of the switch.

12. The system of claim 11, wherein the isolated switch further includes an isolated user input logic for reading user inputs.

13. The system of claim 12, wherein the isolated switch further includes an input mode indicator for providing a visual indication of an input logic state.

14. A method for securing a personal device that includes a device core and at least one peripheral device from unauthorized access or operation, comprising the steps of:
   a. providing an internal isolated switch having operating functions that cannot be affected by either the personal device core or the at least one peripheral device, wherein the switch is selected from the group consisting of a mechanical switch without an electrically operated bypass and an electronic/electrical switch separated electrically from elements or components of the personal device; and
   b. using the isolated switch to protect the device from unauthorized use or access.

15. The method of claim 14, wherein the step of providing an internal isolated switch includes providing an isolated disconnector for connecting and disconnecting the device core from the at least one peripheral device.

16. The method of claim 15, further comprising the step of:
   c. providing a switch mode indicator coupled to the isolated disconnector, for providing a visual indication of a state of the isolated disconnector.

17. The method of claim 15, wherein the step of using includes disconnecting, by an authorized user, the device core from the at least one peripheral device in response to a threat detection or preemptively.

18. The method of claim 14, further comprising the step of:
d. providing an isolated user input logic for reading user inputs into the isolated switch.

19. The method of claim 18, further comprising the step of:
e. providing a user input indicator for providing a visual indication of an input logic state.

* * * * *